(12) United States Patent
Eshel et al.

(10) Patent No.: US 7,325,064 B2
(45) Date of Patent: Jan. 29, 2008

(54) DISTRIBUTED LOCKING PROTOCOL WITH ASYNCHRONOUS TOKEN PREFETCH AND RELINQUISH

(75) Inventors: Marc M Eshel, San Jose, CA (US); Frank B Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 09/907,119

(22) Filed: Jul. 17, 2001

(65) Prior Publication Data

US 2003/0018785 A1 Jan. 23, 2003

(51) Int. Cl.
G06F 15/16 (2006.01)

(52) U.S. Cl. .................. 709/229; 709/226
(58) Field of Classification Search .......... 709/226, 709/229; 707/8; 719/314
See application file for complete search history.

(56) References Cited

U.S. PATENT DOCUMENTS

| | | | | |
|---|---|---|---|---|
| 5,390,318 A | | 2/1995 | Ramakrishnan et al. | 395/425 |
| 5,410,653 A | * | 4/1995 | Macon et al. | 711/137 |
| 5,454,108 A | * | 9/1995 | Devarakonda et al. | 718/714 |
| 5,490,270 A | * | 2/1996 | Devarakonda et al. | 707/201 |
| 5,603,042 A | * | 2/1997 | Kabenjian | 710/51 |
| 5,634,122 A | * | 5/1997 | Loucks et al. | 707/8 |
| 5,751,708 A | * | 5/1998 | Eng et al. | 370/395.42 |
| 5,845,147 A | * | 12/1998 | Vishlitzky et al. | 710/5 |
| 5,889,952 A | | 3/1999 | Hunnicutt et al. | 395/200.49 |
| 5,940,841 A | | 8/1999 | Schmuck et al. | 707/205 |
| 5,950,199 A | | 9/1999 | Schmuck et al. | 707/8 |
| 5,987,477 A | | 11/1999 | Schmuck et al. | 707/201 |
| 5,999,976 A | * | 12/1999 | Schmuck et al. | 709/226 |
| 6,032,216 A | * | 2/2000 | Schmuck et al. | 710/200 |
| 6,385,701 B1 | * | 5/2002 | Krein et al. | 711/141 |
| 6,564,234 B2 | * | 5/2003 | Bamford et al. | 707/203 |
| 6,691,165 B1 | * | 2/2004 | Bruck et al. | 709/227 |
| 6,915,364 B1 | * | 7/2005 | Christensen et al. | 710/104 |
| 6,981,097 B2 | * | 12/2005 | Martin et al. | 711/130 |
| 7,103,065 B1 | * | 9/2006 | Quigley et al. | 370/465 |
| 2002/0120837 A1 | * | 8/2002 | Maxemchuk et al. | 713/153 |
| 2003/0014536 A1 | * | 1/2003 | Christensen et al. | 709/238 |

* cited by examiner

Primary Examiner—William Vaughn
Assistant Examiner—Joseph Maniwang
(74) Attorney, Agent, or Firm—Geraldine Monteleone, Esq.; Kevin P. Radigan, Esq.; Heslin Rothenberg Farley & Mesiti PC

(57) ABSTRACT

Asynchronous messages are used to prefetch and/or relinquish tokens used in providing locking of shared resources. A message is sent to prefetch one or more tokens, and prior to receiving a reply for the message, another message (e.g., an acquire) is sent for at least one of those tokens. Similarly, a message is sent indicating a voluntary relinquish of one or more tokens and without having acknowledgment that the relinquish request was processed, a further message (e.g., an acquire) is sent for at least one of the tokens. Multiple tokens may be acquired and/or relinquished in a single message to the token server. This reduces message delays and overall message traffic.

21 Claims, 10 Drawing Sheets

- ACQUIRE SEQUENCE NUMBER (ASN) — 300
- acquirePending FLAG — 302
- prefetchPending FLAG — 304
- prefetchValid FLAG — 306
- revokePending FLAG — 308

*fig. 3*

DISTRIBUTED LOCKING PROTOCOL WITH ASYNCHRONOUS TOKEN PREFETCH AND RELINQUISH

CROSS-REFERENCE TO RELATED PATENTS

This application contains subject matter which is related to the subject matter of the following patents, each of which is assigned to the same assignee as this application. Each of the below listed patents is hereby incorporated herein by reference in its entirety:

"DISTRIBUTED LOCK MANAGER USING A PASSIVE, STATE-FULL CONTROL-SERVER", by Devarakonda et al., U.S. Pat. No. 5,454,108, issued Sep. 26, 1995;

"PARALLEL FILE SYSTEM WITH EXTENDED FILE ATTRIBUTES", by Schmuck et al., U.S. Pat. No. 5,940,841, issued Aug. 17, 1999;

"PARALLEL FILE SYSTEM AND METHOD FOR GRANTING BYTE RANGE TOKENS", by Schmuck et al., U.S. Pat. No. 5,950,199, issued Sep. 7, 1999;

"PARALLEL FILE SYSTEM AND METHOD FOR PARALLEL WRITE SHARING", by Schmuck et al., U.S. Pat. No. 5,987,477, issued Nov. 16, 1999;

"PARALLEL FILE SYSTEM AND METHOD WITH BYTE RANGE API LOCKING", by Schmuck et al., U.S. Pat. No. 5,999,976, issued Dec. 7, 1999; and "PARALLEL FILE SYSTEM WITH METHOD USING TOKENS FOR LOCKING MODES", by Schmuck et al., U.S. Pat. No. 6,032,216, issued Feb. 29, 2000.

TECHNICAL FIELD

This invention relates, in general, to distributed locking, and in particular, to providing a distributed locking protocol that uses asynchronous prefetching and/or relinquishing of tokens.

BACKGROUND OF THE INVENTION

In a distributed communications environment, resources may be shared among a plurality of the nodes of the distributed environment. In order to coordinate access to the shared resources, a distributed lock manager is used. The distributed lock manager includes, for instance, a layer of software that runs on each of the nodes of the environment.

The distributed lock manager uses at least one locking protocol to coordinate access to the shared resources. In one example, the locking protocol is a token-based protocol in which the distributed lock manager interfaces with a token server to obtain tokens, and then grants lock requests based on the granted tokens.

For example, when an application requests a lock of a resource, the local lock manager of the node in which the application is executing sends a request to the token server to acquire a corresponding token for the resource. Once the token is acquired, the lock manager can grant the requested lock. When the lock is released, the node retains the token so that subsequent lock requests for the same resource can be granted locally without requiring additional messages to the token server. The token server keeps track of which tokens are held by which nodes.

When the token server receives a request from a node for a token that is currently held by another node, the other node needs to relinquish its token before it can be granted to the requesting node. This is accomplished by having the lock manager of the requesting node send a revoke request to the node holding the token. In response to the revoke request, the node checks whether a lock requiring the token is currently held, waits for any such lock to be released, and then sends a message to the token server to relinquish the token.

The processes of acquiring and relinquishing tokens have traditionally used synchronous communications. That is, only one request associated with a particular token could be sent by a lock manager at any one time. Any other requests by that lock manager associated with that token needed to wait until a reply to the previous request was received. This use of synchronous communications increased message overhead causing greater message delays and greater overall message traffic.

Thus, a need exists for a capability that enables the use of messages other than synchronous messages to acquire and relinquish tokens. A further need exists for a capability that reduces message overhead.

SUMMARY OF THE INVENTION

The shortcomings of the prior art are overcome and additional advantages are provided through the provision of a method of managing tokens usable in the locking of shared resources of a communications environment. The method includes, for instance, providing by a lock manager of the communications environment a request for a token; and having no acknowledgment that the request for the token was processed, sending by the lock manager another request for the token.

In a further embodiment of the invention, a method of managing tokens usable in the locking of shared resources of a communications environment is provided. The method includes, for instance, sending a request from a lock manager to a token server to prefetch a token; prior to the token server replying to the prefetch request, sending from the lock manager to the token server a request to acquire the token; and processing at least one request of the prefetch request and the acquire request, the processing using at least one of a sequence number and one or more flags to process the at least one request.

In yet a further embodiment of the present invention, a method of managing tokens usable in the locking of shared resources of a communications environment is provided. The method includes, for instance, sending a request from a lock manager to a token server to relinquish a token; having no confirmation that the relinquish request was processed, sending from the lock manager to the token server a request to acquire the token; and processing at least one request of the relinquish request and the acquire request, the processing using at least one of a sequence number and one or more flags to process the at least one request.

System and computer program products corresponding to the above-summarized methods are also described and claimed herein.

In accordance with one or more aspects of the present invention, asynchronous prefetching and/or relinquishing of tokens is provided. Further, one or more aspects of the present invention allow multiple tokens to be acquired and/or relinquished in a single message.

Advantageously, message delay, overall message traffic and message overhead are reduced.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts one embodiment of state information used by an aspect of the locking protocol of the present invention;

BEST MODE FOR CARRYING OUT THE INVENTION

In accordance with an aspect of the present invention, a distributed locking protocol is provided in which asynchronous messages are used to perform various actions related to the locking of shared resources, including the prefetching and/or relinquishing of tokens used to control access to the shared resources.

Figure 1:
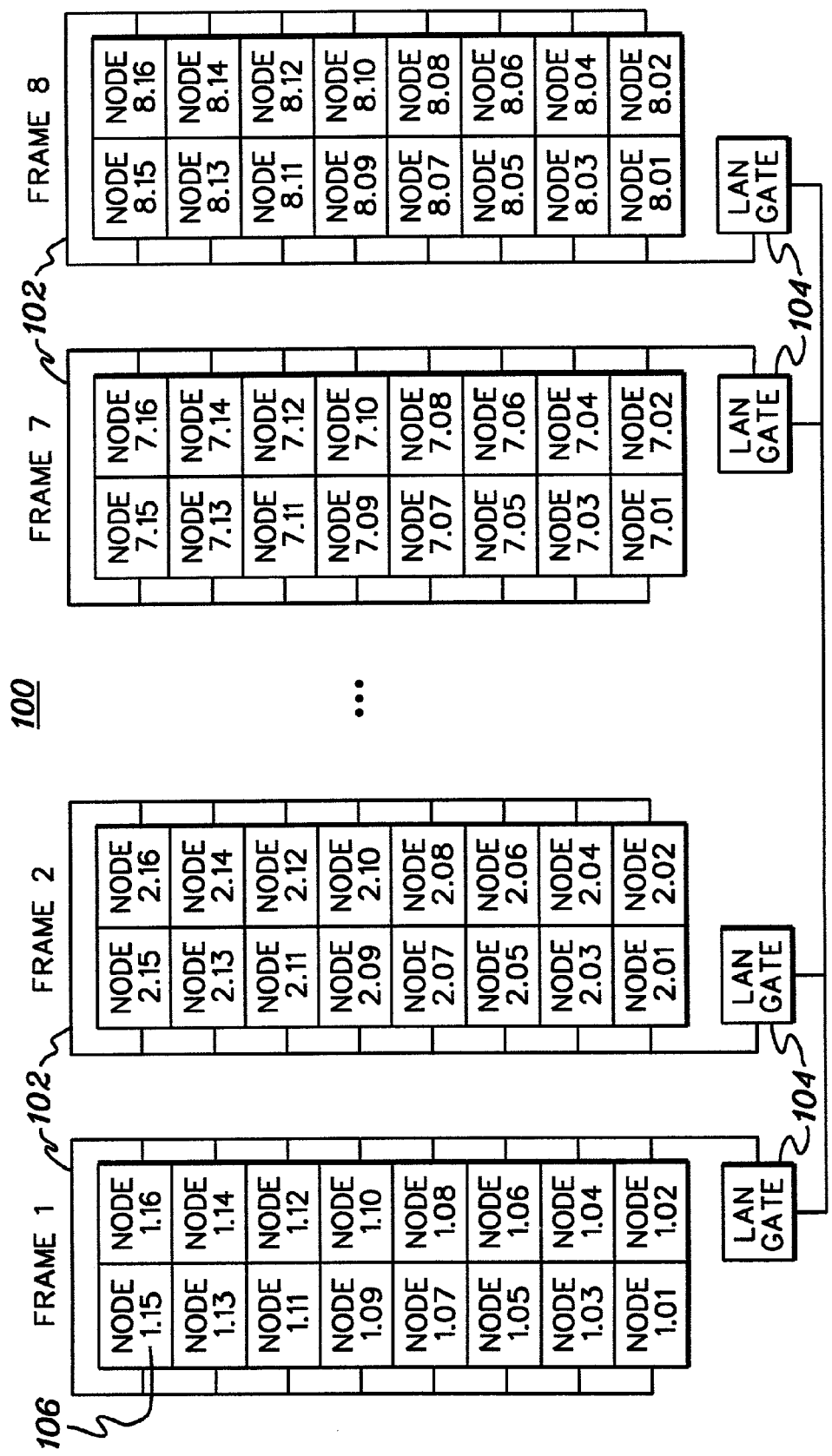
FIG. 1 depicts one example of a communications environment incorporating and using one or more aspects of the present invention.

One embodiment of a communications environment incorporating and using aspects of the present invention is depicted in FIG. 1. As one example, the communications environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a Risc/6000 computer running AIX, a Unix based operating system. Each processing node within a frame is coupled to the other processing nodes of the frame via, for example, at least one internal LAN connection. Additionally, each frame is coupled to the other frames via LAN gates 104.

As examples, each LAN gate 104 includes either a Risc/6000 computer, any computer network connection to the LAN or a network router. However, these are only examples. It will be apparent to those skilled in the relevant art that there are other types of LAN gates and that other mechanisms can also be used to couple the frames to one another.

The distributed computing environment of FIG. 1 is only one example. It is possible to have more or less than eight frames, or more or less than sixteen nodes per frame. Further, the processing nodes do not have to be Risc/6000 computers running AIX. Some or all of the processing nodes can include different types of computers and/or different operating systems. Further, aspects of the invention are usable with other types of communications environments. All of these variations are considered a part of the claimed invention.

Figure 2:
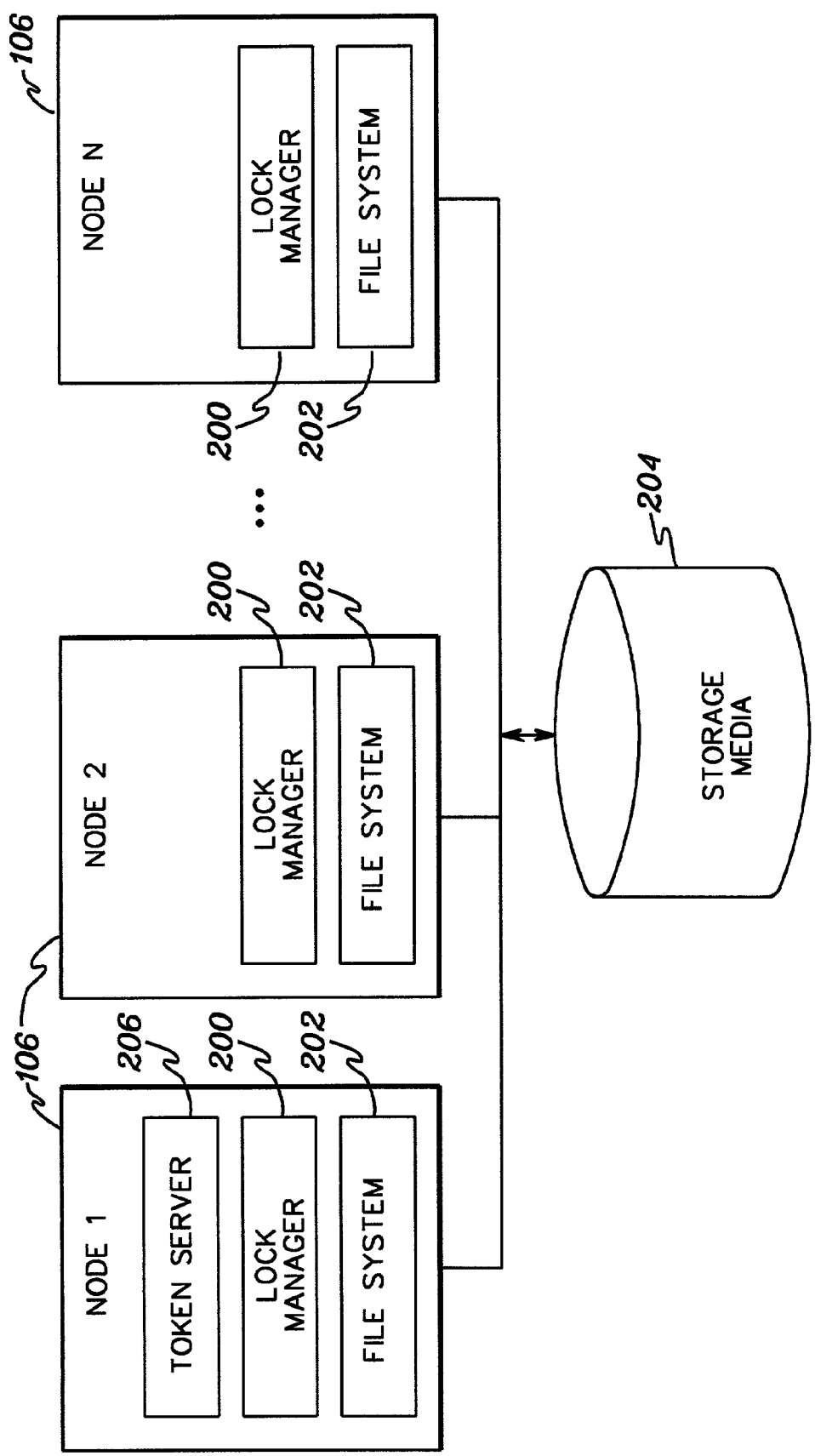
FIG. 2 depicts further details regarding a plurality of nodes of the communications environment of FIG. 1, in accordance with an aspect of the present invention.

In one example, distributed across a plurality of the processing nodes of distributed computing environment 100 is a distributed lock manager 200 (FIG. 2). The distributed lock manager is responsible for coordinating access to shared resources among a set of networked processing nodes or computer systems. In particular, applications running on the processing nodes send requests to their local lock manager to access the shared resources. One example of an application that uses a lock manager is a distributed file system 202, such as the General Parallel File System (GPFS) offered by International Business Machines Corporation. GPFS uses locking to coordinate updates to shared files stored on one or more storage media 204 (e.g., disks) coupled to the nodes.

A lock manager typically supports several different lock modes. For example, a lock manager can support shared locks (e.g., read locks), which can be held by multiple nodes concurrently, as well as exclusive locks (e.g., write locks), which can be held by only one node at a time. A lock manager may also support range locks, which are used to coordinate access to different parts of a shared resource. For example, a byte range lock can be used to allow concurrent access to different parts of a shared file from multiple nodes.

The meaning of the lock modes is defined in terms of a conflict table, i.e., a symmetric relation that for each pair of lock modes defines whether the two modes are compatible or in conflict with each other. The conflict table implies a partial order on the set of lock modes. For example, it can be stated that lock mode L2 is stronger than L1, if L2 conflicts with all the lock modes that L1 conflicts with and L2 is not equal to L1. It is the responsibility of the lock manager to ensure that the locks being granted are compatible with the conflict table.

In one example, the distributed lock manager is a token-based lock manager that uses tokens to coordinate access to the shared resources. The tokens are obtained from a service, executing on at least one node, that coordinates the use of the tokens. This service is referred to as a token server 206.

The token server is responsible for granting tokens requested by nodes and for taking back tokens held by one or more nodes, when those nodes no longer need the tokens or the tokens are needed by other nodes. The token server keeps track of the tokens held by the various nodes.

The token server grants/takes back tokens in response to requests received from the local lock managers. The local lock managers are responding in turn to requests from applications (e.g., GPFS). For example, an application may request to acquire a lock. In an acquire request, the application specifies, for instance, a key that identifies the resource to be locked, an optional integer interval or range that identifies what part of the resource is to be locked, and a lock mode. Additionally, in accordance with an aspect of the present invention, the application may specify additional locks that may be needed in the near future.

As a further example, an application may request to release a lock. The release request includes, for instance, the key of the resource to be released and a lock mode. Further, in accordance with an aspect of the present invention, the application may specify additional locks to be released.

The application sends each of its requests to the lock manager executing on the same node as the application. The lock manager is then responsible for handling the requests. This responsibility includes, for instance, communicating with the token server to acquire and/or relinquish tokens and to determine when locks are to be granted. The lock manager relies on various state information associated with the tokens and the previously granted locks to fulfill its responsibility.

In one embodiment, the state information utilized by the lock manager includes the following:

1. A lock state maintained by the lock manager on each node. This is a set of (key, lock mode) pairs, where each pair represents a lock that is currently held by an application on that node;
2. A token state maintained by the lock manager on each node. This is a set of (key, lock mode) pairs, where each pair represents a token that is currently held by that node; and
3. A token state maintained by the token manager. This is a set of (key, lock mode, node) triples, where each triple represents a token that the token server has granted to a node.

For resources supporting range locks, the elements of the lock state and token state also include range information, in addition to the key and lock mode.

In determining whether a lock or a token is to be granted, certain rules are followed. In one embodiment, these rules include:

1. If a lock is held in mode L1 on a node N1, then the local lock manager on N1 does not grant a lock on the same object (e.g., same key and same or overlapping ranges) in mode L2, unless L1 and L2 are compatible;
2. The lock manager at each node does not grant a lock in mode L1, unless its local token state indicates that it is holding a token in a mode L2 greater than or equal to L1. Further, it will not relinquish the token until the lock is released;
3. If the token server state indicates that N1 is holding a token in mode L1, the token server will not grant a token in mode L2 to another node N2, unless L1 and L2 are compatible;
4. For each token held by a node N1, as recorded in the token state at N1, the state at the token server is to indicate that N1 is holding a token, and the mode recorded at the token server is to be greater than or equal to the mode recorded at N1.

Note that Rules 1-3 above are local rules, i.e., rules that can be enforced by simply checking the local lock state or token state before granting a lock or a token. This is because each of the first three rules only refers to the lock or token state that is local to the node making the decision whether to grant a lock/token.

Rule 4, on the other hand, refers to the token state on different nodes. One of the goals of the locking protocol is to keep the token state at the token server in synchronization with the local token states at each of the nodes, but the two states may differ while a token request or a reply to a token request is in transit. (Token states may also diverge due to node failures.) However, as long as the token mode recorded at the token server is at least as strong as the mode recorded in the state of the local lock manager (i.e., as long as Rule 4 is maintained), the lock manager behaves correctly.

In accordance with an aspect of the present invention, a locking protocol is provided that not only satisfies the above rules, but also enables asynchronous prefetching and/or relinquishing of tokens. This locking protocol is maintained and/or utilized by the distributed lock manager. It is the distributed lock manager (i.e., the local lock managers that comprise the distributed lock manager) that sends requests to the token server to obtain and/or relinquish tokens.

As one example, there are two main types of token requests that are sent from the lock manager to the token server. These include, for instance, (1) an "Acquire" request, which asks the token server to grant a token that is not currently held by the requesting node, or to grant a token in a mode that is stronger than currently held (a token upgrade); and (2) a "Relinquish" request, which informs the token server that the sending node is giving up a token or wants to reduce the lock mode of the currently held token to a weaker mode (a token downgrade), so that the token can be granted to another node.

In addition to the requests to the token server, there is a third type of request, a "Revoke" request, which is sent between lock managers. A revoke request is sent if a token request was denied because a conflicting token is held by another node (Rule 3). In this case, the reply from the token server to the acquire request includes a list of nodes that are holding conflicting tokens. In response to this reply, the local lock manager sends a revoke request to the local lock manager at each of the nodes in the conflict list, which relinquishes or downgrades their token after waiting for local locks to be released, as necessary to observe Rule 2. The lock manager that sent out the revoke requests waits for replies from the revoking nodes, and then can send another acquire request to the token server.

Depending on the context in which the request is sent, a distinction is made between two different Acquire and three different Relinquish requests, as explained below. The different kinds of requests are categorized, in accordance with an aspect of the present invention, as either synchronous or asynchronous requests, depending on whether additional requests for the same token by the same lock manager are allowed, while a request is pending. In one embodiment, the various requests include the following:

A1 Synchronous Acquire Request: This request is sent from the lock manager to the token server, when it is desirous to acquire or upgrade a token in order to satisfy a lock request by an application running on the node. This request is synchronous in the sense that no other acquire/synchronous relinquish requests for that particular token is to be sent by the lock manager until the token server has granted the requested token and the local token state has been updated accordingly.

A2 Prefetch Request: This request is sent from the lock manager to the token server in order to obtain a token or upgrade a token identified by an application as may be needed to satisfy a lock request in the near future. This request is asynchronous in the sense that should the application issue a lock request requiring this token, then a regular, synchronous acquire request will be sent by the lock manager, even if the reply to the prefetch request has not yet arrived at the lock manager.

A prefetch request may be sent as a separate message to the token server. However, typically, one or more prefetch requests are sent together with a synchronous acquire request (A1), as a single message to the token server. The token server processes each as a separate request, but sends a reply to all the requests as a single message.

In one embodiment, the content of a prefetch request (what token will be needed and what lock mode will be required) is determined by an application (such as GPFS) at a node N1 from the context in which the original token request is made. For example, opening a file for writing requires read-only access to file attributes to check access rights, but the fact that the file was opened for writing indicates that it is likely that additional tokens will be needed to update the file content and file size. Thus, based on this information, one or more prefetch requests are generated. For example, the application may request to prefetch a token that allows updating the inode and a range token that allows changing the file content.

When the token server receives the request, it first processes the original token request, including any processing necessary to revoke conflicting tokens from other nodes (as described herein). Then, before sending the final reply to N1 that grants the requested token, the server processes the prefetch requests. For each of the additional tokens requested, the server checks whether conflicting tokens are held. If no conflicting tokens are held (i.e., if the token can be granted without revoking tokens from other nodes), then the token server grants the token, and includes the additional token in the reply sent to N1.

R1 Asynchronous Relinquish Request: This request is sent from the lock manager to the token server in response to a revoke request from a local lock manager on another node. This request is asynchronous in the sense that, if and when it is necessary or desirable to acquire the token again, a synchronous acquire (A1) or prefetch request (A2) is sent to the token server from the lock manager without the lock manager waiting for confirmation that the relinquish request has been processed at the token server.

R2 Asynchronous Voluntary Relinquish: This request is sent from a lock manager to the token server to relinquish or downgrade a token that is no longer needed at the local node, so that it can be granted to another node without requiring a revoke message. This request is asynchronous in the sense that, if and when it is necessary or desirable to acquire the token again, a synchronous acquire (A1) or prefetch request (A2) will be sent to the token server from the lock manager without the lock manager waiting for confirmation that the relinquish request has been processed at the token server.

An asynchronous voluntary relinquish request may be sent as a separate message to the token server. However, typically one or more relinquish requests are sent together as a single message to the token server. The token server processes each as a separate request. Since these requests are asynchronous, no individual replies are required.

R3 Synchronous Voluntary Token Relinquish Request: This request is sent from a lock manager to the token server to relinquish a token that is no longer needed. It is synchronous in the sense that no other requests (e.g., acquire and/or relinquish requests) for the same token by the same lock manager are issued until a reply from the token server has been processed.

Multiple synchronous relinquish requests may be sent to the token server as a single message. The token server processes each as a separate request, but sends a single reply as acknowledgment that all requests have been processed.

In order to maintain token consistency (Rule 4 above) on requests that result in a stronger token being granted, i.e., acquire requests (A1 or A2), the token server updates its token state before the requesting node updates its local state. However, on requests that result in a weaker token, i.e., relinquish requests (R1, R2, or R3), the token server updates its token state after the requesting node has updated its local state. Consequently, on token acquire requests, the local token state on the requesting node is updated after the reply from the token server has been received, whereas on relinquish requests (R1, R2, R3) the local token state is updated before sending the request to the token server. If all token requests were sent synchronously, as they are in traditional distributed lock managers (e.g., as described in U.S. Pat. No. 5,454,108, which is hereby incorporated herein by reference in its entirety), then this would be sufficient to guarantee token consistency.

However, since in one aspect of the present invention the locking protocol allows asynchronous requests, the token server may receive acquire and relinquish requests for the same token in an order that differs from the order in which these requests were issued. Furthermore, when the token server has processed one request, it may receive another request from the same node before the reply to the first request has been processed on the originating node.

In order to detect requests or replies that arrive out-of-order or too late, and to handle such requests correctly, such that token consistency (Rule 4) is maintained, additional state information is used by the token server and/or the local lock manager. This additional state information includes, for instance:

(1) An Acquire Sequence Number 300 (FIG. 3), which is a unique number assigned to each token by the lock manager when the token is acquired.

The ASN is stored at the token server and used by the token server to detect requests that arrive out-of-order. For example, when the lock manager sends an acquire message (A1 or A2) to the token server, it first increments the ASN associated with the token and includes the new ASN in the message to the server. When the token server grants a token, it records the sequence number it received together with the token and mode that it granted to the node. Then, if the token server receives an acquire request from a node N1 with an ASN that is less than the ASN currently recorded for N1 and this token, it knows that it has already received and processed a more recent acquire request from the same node. Thus, the request containing the smaller ASN arrived late and is ignored. That is, the token server sends a reply indicating that the request was not granted.

As a further example, the ASN is included in a relinquish message (R1, R2, or R3) that the lock manager sends to the token server. If an acquire (A1 and/or A2) request is pending at the time the relinquish message is sent, the ASN value included in the relinquish message is the value from before the pending acquire message(s) were sent. Thus, if the token server receives a relinquish request with an ASN that is less than the currently recorded one, the relinquish request was sent before the reply to the most recently granted acquire request was received and processed by N1. In this case, the server simply ignores the relinquish request.

If the token server receives a relinquish request with an ASN that matches the currently recorded ASN, it processes the request by setting the mode for the affected token to the weaker of the currently recorded mode and the mode received in the relinquish request. This is because the originating node may have sent multiple relinquish requests with the same ASN, downgrading its token to successively weaker token modes. Setting the mode recorded by the token server to the minimum of these modes has the same effect as processing the relinquish requests in the order they were sent (from strongest to weakest mode).

(2) An acquirePending flag 302, which is set for a token when the local lock manager sends a synchronous acquire request (A1) to the token server for that token, and is reset when it receives an acknowledgment that the token has been granted. While the flag is set, other lock requests that would also need to acquire or upgrade the same token, are blocked until the acquirePending flag is cleared. This ensures that there is only one synchronous acquire request pending at a time. (The acquirePending flag is maintained by the local lock manager.)

(3) A prefetchPending flag 304, which is set for a token when the local lock manager sends a token prefetch request (A2) to the token server, and it is reset when it receives an acknowledgment that the token has been granted. It is maintained at the local lock manager.

(4) A prefetchValid flag 306, which is also set for a token when the local lock manager sends a token prefetch request (A2) for that token to the token server, and it is reset when it receives an acknowledgment that the token has been granted. The prefetchValid flag is also cleared any time a synchronous acquire (A1) or a relinquish or downgrade request is sent (R1, R2, or R3). The prefetchValid flag is maintained at the local lock manager.

(5) A revokePending flag 308, which is set at the token server when a revoke of one or more tokens is in progress, and it is reset when the revoke is complete. This ensures that only one node can revoke tokens from one or more nodes at any one time. The revokePending flag is maintained at the token server.

As described in further detail below, before the lock manager sends a prefetch request for a particular token, it checks the acquirePending and prefetchPending flags for that token. If either of the two is already set, it refrains from sending the request. That is, it will not attempt to prefetch a token, if another synchronous or asynchronous acquire request from the lock manager is already pending for that token. Further, when the reply to the prefetch request arrives and the prefetchValid flag is still set, it is known that no other acquire or relinquish request was sent since the prefetch request, and the local token state can be updated to reflect the mode that was granted in the prefetch reply. Otherwise, the reply to the prefetch request is simply ignored, because the token state maintained by the token server may since have changed and updating the local state might violate token consistency (Rule 4).

Further details associated with sending and processing acquire and relinquish requests are described below with reference to FIGS. 4a, 4b-8a, 8b. In particular, the sending of requests from the local lock manager to the token server is described with reference to FIGS. 4a-8a, and the processing of those requests by the token server is described with reference to FIGS. 4b-8b.

Figure 4A:
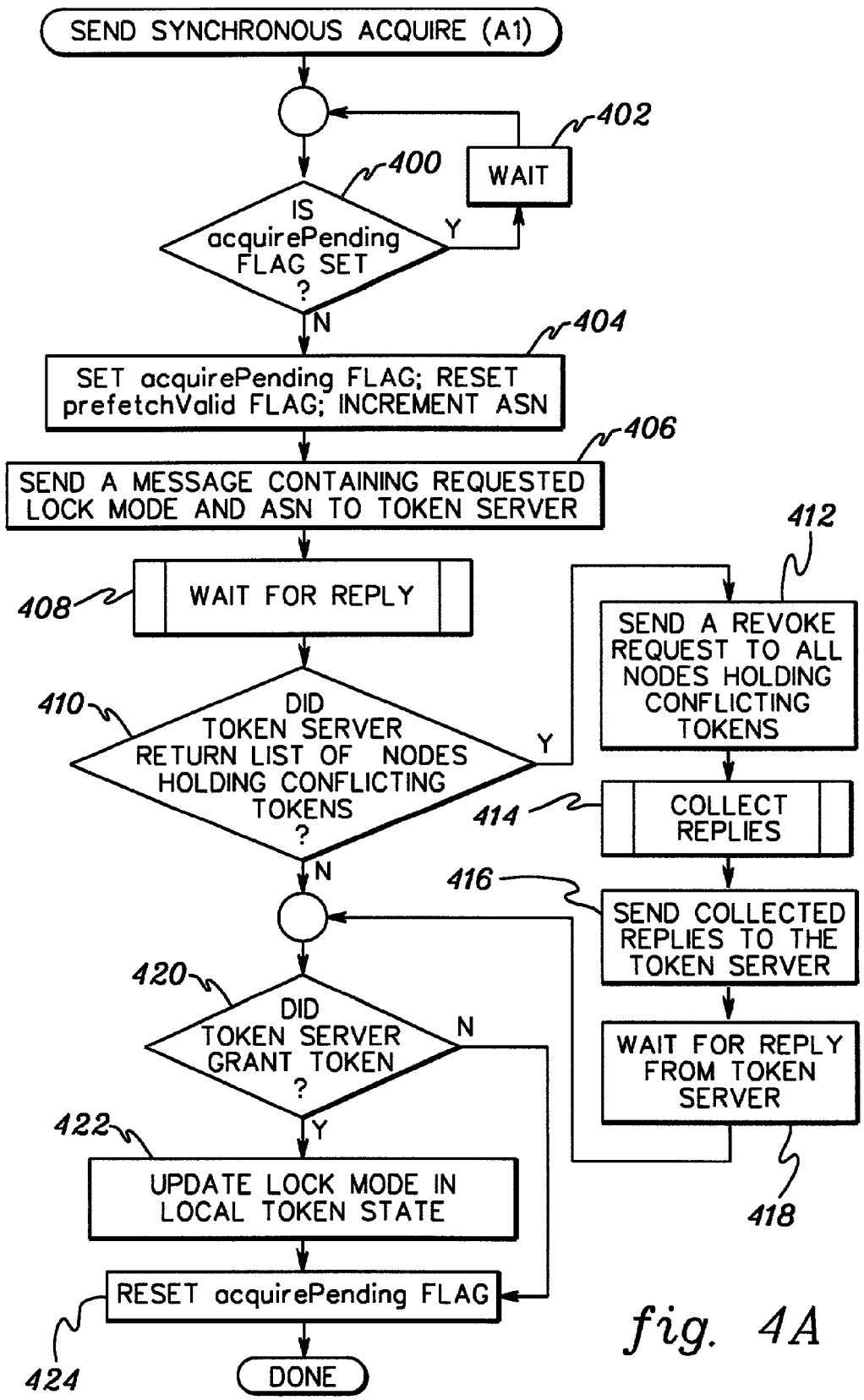
FIGS. 4a-4b depict one embodiment of the logic associated with sending and processing a synchronous acquire request, in accordance with an aspect of the present invention.

With reference to FIG. 4a, one embodiment of the logic associated with sending a synchronous acquire (A1) message from a local lock manager to the token server for a desired token is described. Initially, a determination is made as to whether the acquirePending flag for the desired token is set, INQUIRY 400. If the acquirePending flag is set, then a synchronous acquire request for the desired token has previously been sent to the token server by the local lock manager, so the local lock manager waits for an acknowledgment from the token server before sending another synchronous acquire request for this token, STEP 402.

However, if the acquirePending flag is not set, then the sending of the synchronous acquire message continues. In particular, the acquirePending flag for the desired token is set. Further, the prefetchValid flag for the token is reset (e.g., cleared), and the Acquire Sequence Number associated with the requested token is incremented, STEP 404.

Thereafter, a message including, for instance, a key identifying the object to which the token applies, the requested lock mode and the Acquire Sequence Number, is sent from the local lock manager to the token server, STEP 406. The token server processes this message as described further below with reference to FIG. 4b. While the message is being processed, the local lock manager waits for a reply from the token server, STEP 408.

Subsequent to receiving the reply, the local lock manager determines whether the token server returned a list of one or more nodes holding conflicting tokens, INQUIRY 410. If the token server did return such a list of nodes, then the local lock manager sends a revoke request to those nodes holding the conflicting tokens, STEP 412. In particular, in one example, a revoke request is sent to each local lock manager on each node holding conflicting tokens. Each revoke request includes the ASN recorded by the token server at the time it granted the token to each of the nodes from which the token is now being revoked. This ASN was obtained from the token server in the reply to the acquire request.

In response to the revoke request, each node relinquishes the one or more tokens it is holding via an asynchronous relinquish (R1) request, which is further described below. The node requesting the revocations collects the R1 replies from the nodes having their tokens revoked, STEP 414. The collected replies are forwarded to the token server, STEP 416, and the local lock manager waits for a reply from the token server indicating whether the requested token was granted, STEP 418.

Subsequently or if the token server did not return a list of nodes holding conflicting tokens, then a further determination is made as to whether the token server granted the token, INQUIRY 420. If the token server indicated in its reply that the token was granted, then the lock mode in the local token state is updated to reflect the granted mode of the token, STEP 422. Additionally or if the token server did not grant the token, then the acquirePending flag is reset, STEP 424. This completes the processing by the local lock manager of sending a synchronous acquire request to the token server.

When the token server receives the synchronous acquire request, it processes the request for the desired token. One embodiment of the logic associated with processing the synchronous acquire request by the token server is described with reference to FIG. 4b. Initially, a determination is made as to whether the revokePending flag is set, INQUIRY 430. If the revokePending flag is set indicating that a revoke is being processed, then the token server waits for the revoke to complete, STEP 432. However, if the revokePending flag is not set, then a further determination is made as to whether there are conflicting tokens granted to other nodes, INQUIRY 434. In one embodiment, this determination is made by referring to the conflict table.

If there are conflicting tokens granted to other nodes, then the revokePending flag is set, STEP 436, and a list of conflicting token holders is sent to the requesting node, STEP 438. This is the reply indicated in FIG. 4a at STEP 408.

Returning to FIG. 4b, the token server then waits for a reply from the local lock manager, STEP 440. This reply includes the replies collected at STEP 414 (FIG. 4a) and sent at STEP 416.

Figure 4B:
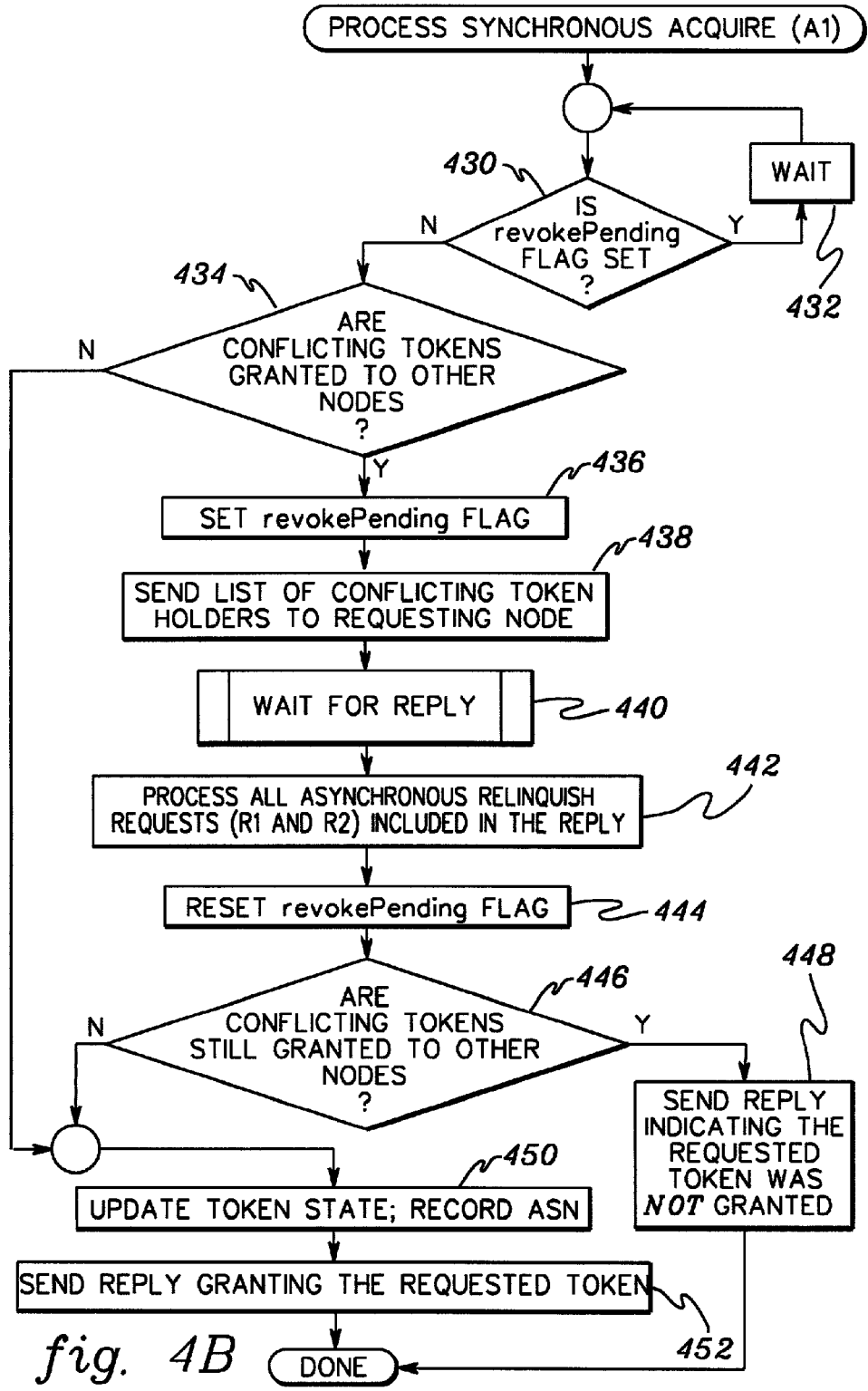

Subsequent to receiving the reply, the token server processes the asynchronous relinquish requests (R1 and R2) included in the reply, STEP 442 (FIG. 4b). In particular, as one example, the token server processes the R1 requests that the revoking node collected in response to its revoke requests. Further, a node that is relinquishing a token in response to a revoke request may further decide to voluntarily relinquish additional tokens via R2 requests that can be batched with the R1 message. Therefore, the replies that were collected by the revoking node and are being processed by the token server may contain R1 as well as R2 requests. These requests are described further below.

Subsequent to processing the asynchronous relinquish requests, the revokePending flag is reset, STEP 444. Then, a determination is made as to whether there are still conflicting tokens granted to other nodes, INQUIRY 446. If so, then a reply is sent to the lock manager indicating that the requested token was not granted, STEP 448. This reply is indicated in FIG. 4a at STEP 418.

However, if there were no conflicting tokens or there are no longer any conflicting tokens, then the token state at the token server is updated and the ASN is recorded, STEP 450. Additionally, a reply granting the requested token is sent to the local lock manager, STEP 452. This reply is indicated at either STEP 418 or STEP 408 of FIG. 4a. This concludes the processing of the synchronous acquire request.

Figure 5A:
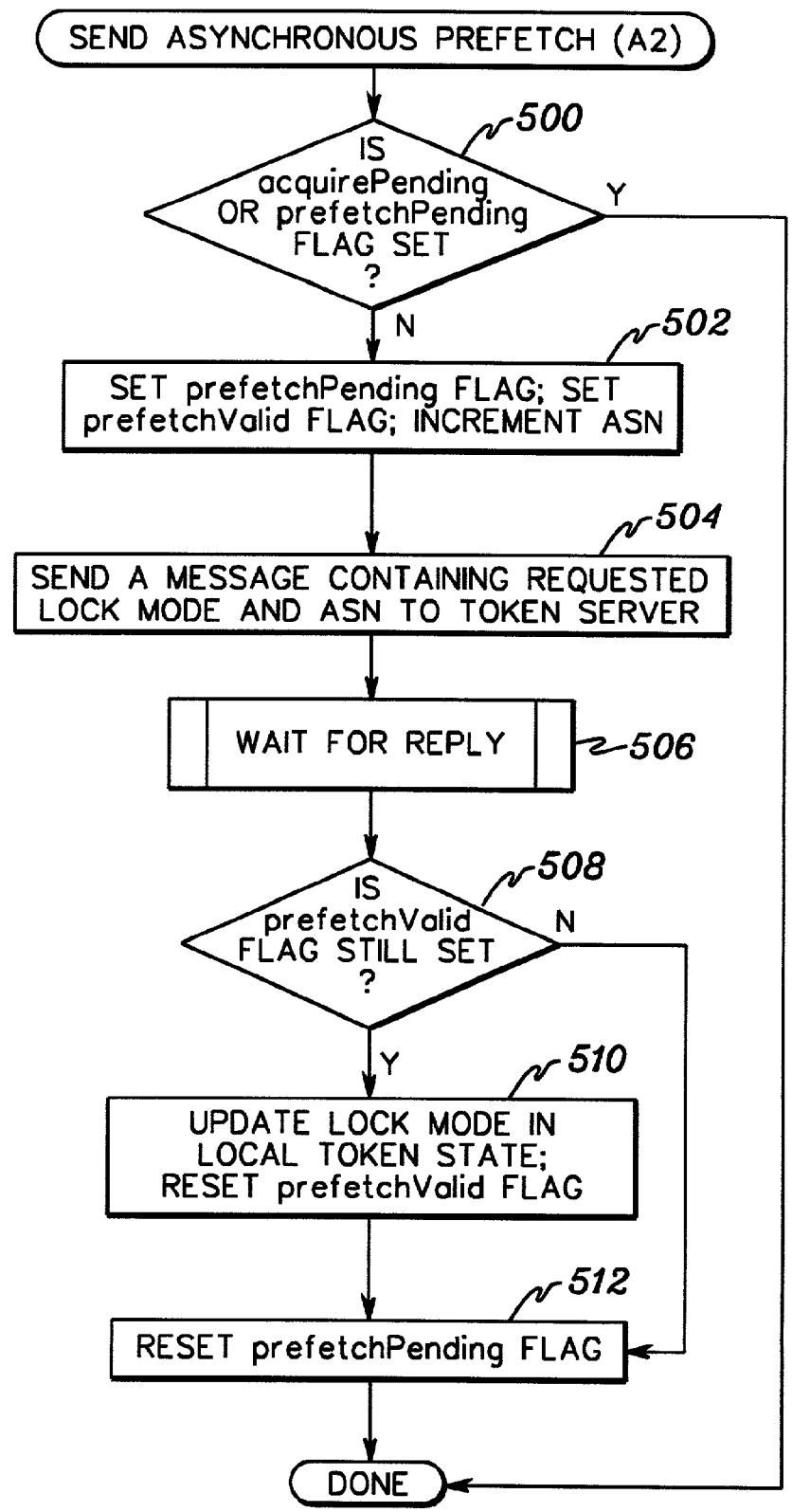
FIGS. 5a-5b depict one embodiment of the logic associated with sending and processing an asynchronous prefetch request, in accordance with an aspect of the present invention.

One embodiment of the logic associated with sending an asynchronous prefetch (A2) request from a local lock manager to the token server is described with reference to FIG. 5a. Initially, a determination is made as to whether the acquirePending flag or prefetchPending flag for the token being requested is set, INQUIRY 500. If either of these two flags is set, then the local lock manager refrains from sending the request. That is, the lock manager does not attempt to prefetch a token if another synchronous or asynchronous acquire request is already pending for that token.

However, if the acquirePending and prefetchPending flags are not set, then the prefetchPending and the prefetchValid flags are set, and the ASN is incremented, STEP 502. Thereafter, a message including, for instance, a key indicating the object to which the token applies, the requested lock mode, and the ASN is sent to the token server to be processed, STEP 504. (Although the asynchronous acquire request is described here as if it is being sent as an independent request, it can be sent and logically is treated as such, but typically it is batched with a synchronous request and/or one or more other asynchronous requests.)

The local lock manager then waits for a reply from the token server, STEP 506. After it receives its reply, a determination is made as to whether the prefetchValid flag is still set, INQUIRY 508. If the flag is still set, then it is known that no other acquire or relinquish request was sent since the prefetch request. Thus, the lock mode in the local token state is updated, and the prefetchValid flag is reset, STEP 510. Additionally or if the prefetchValid flag is not still set, then the prefetchPending flag is reset, STEP 512. This concludes the processing associated with sending an asynchronous prefetch request by a local lock manager to the token server.

One embodiment of the logic associated with processing an asynchronous prefetch request by the token server is described with reference to FIG. 5b. When the token server receives a prefetch request for a requested token, the token server makes a determination as to whether the revokePending flag is set, INQUIRY 520. If the flag is not set, then a further determination is made as to whether the ASN that has been received in the message is greater than the recorded ASN, INQUIRY 522. Should the revokePending flag not be set and the received ASN be greater than the recorded ASN, then yet a further determination is made as to whether there are conflicting tokens granted to other nodes, INQUIRY 524. If there are no conflicting tokens granted to other nodes, then the token state is updated at the token server, and the ASN is recorded, STEP 526. Further, a reply granting the requested token is sent to the local lock manager, STEP 528. This is the reply indicated in FIG. 5a at STEP 506.

Since typically, but not necessarily, one or more A2 requests are sent in a single message with an A1 request, the reply sent for the A2 request is sent as a single message with the final reply for the A1 request, together with the replies to other A2 requests received at the same time. Each A2 request is processed as described herein.

Figure 5B:
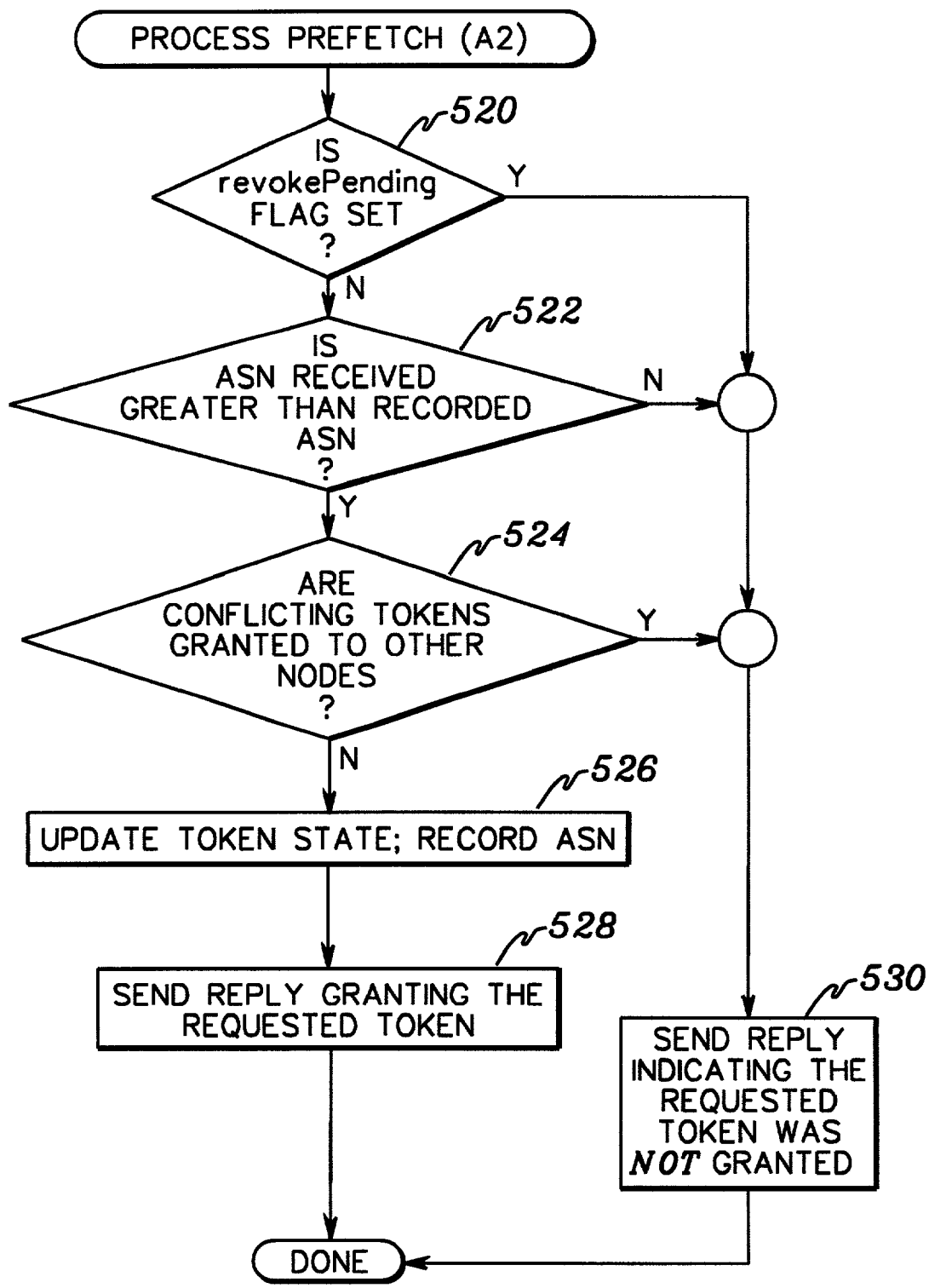

Returning to INQUIRIES 520, 522 and 524 of FIG. 5b, if the revokePending flag is set, or if the received ASN is not greater than the recorded ASN, or if there are conflicting tokens granted to other nodes, then a reply indicating the requested token was not granted is sent to the lock manager, STEP 530. Again, this is the reply indicated at STEP 506 of FIG. 5a. That is, in this embodiment, a prefetch request is not granted if other nodes are holding the tokens in a conflicting mode. Since a prefetch request is based on a possible future need, conflicting tokens are not revoked. This concludes processing of an asynchronous prefetch request.

Figure 6A:
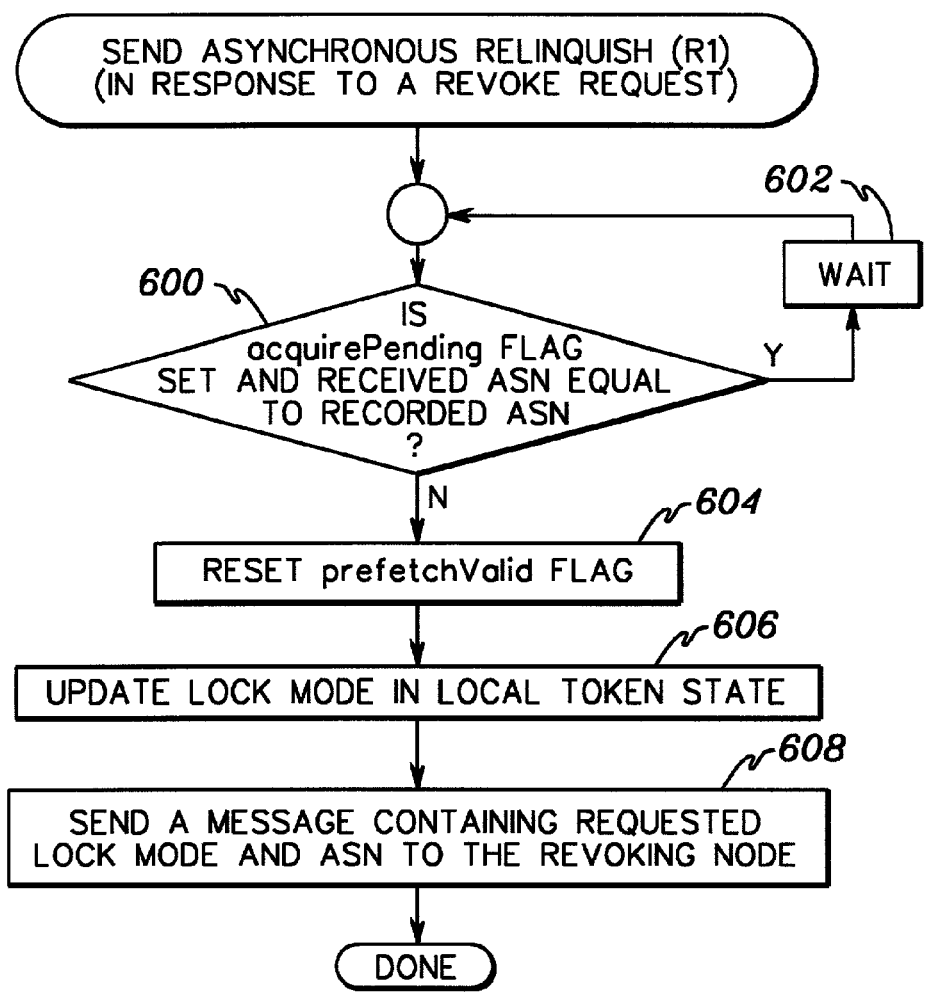
FIGS. 6a-6b depict one embodiment of the logic associated with sending and processing an asynchronous relinquish request, in accordance with an aspect of the present invention.
Figure 6B:
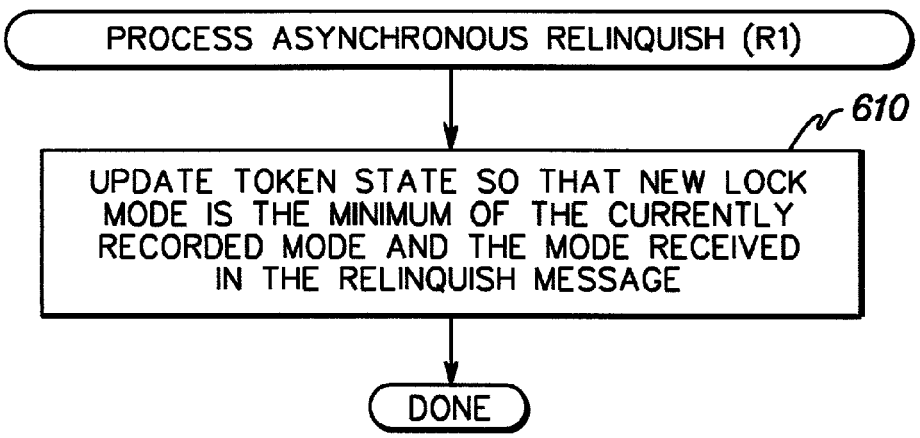
Figure 7A:
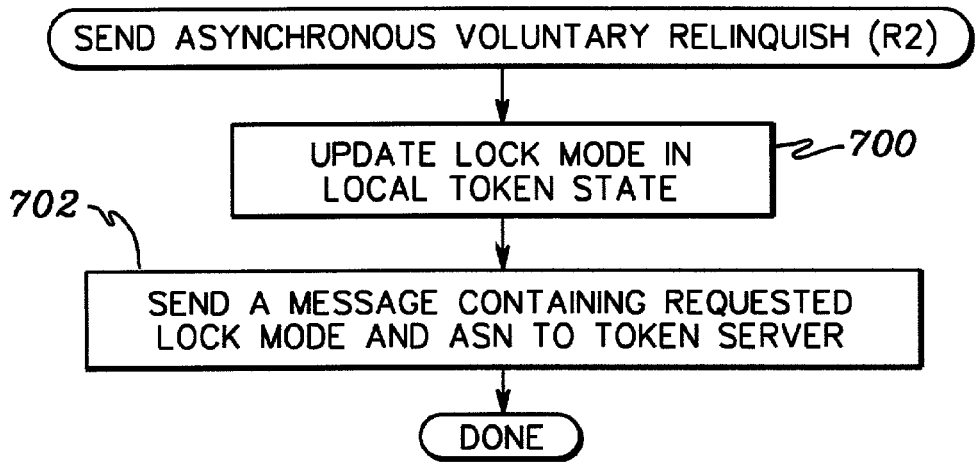
FIGS. 7a-7b depict one embodiment of the logic associated with sending and processing an asynchronous voluntary relinquish request, in accordance with an aspect of the present invention.
Figure 7B:
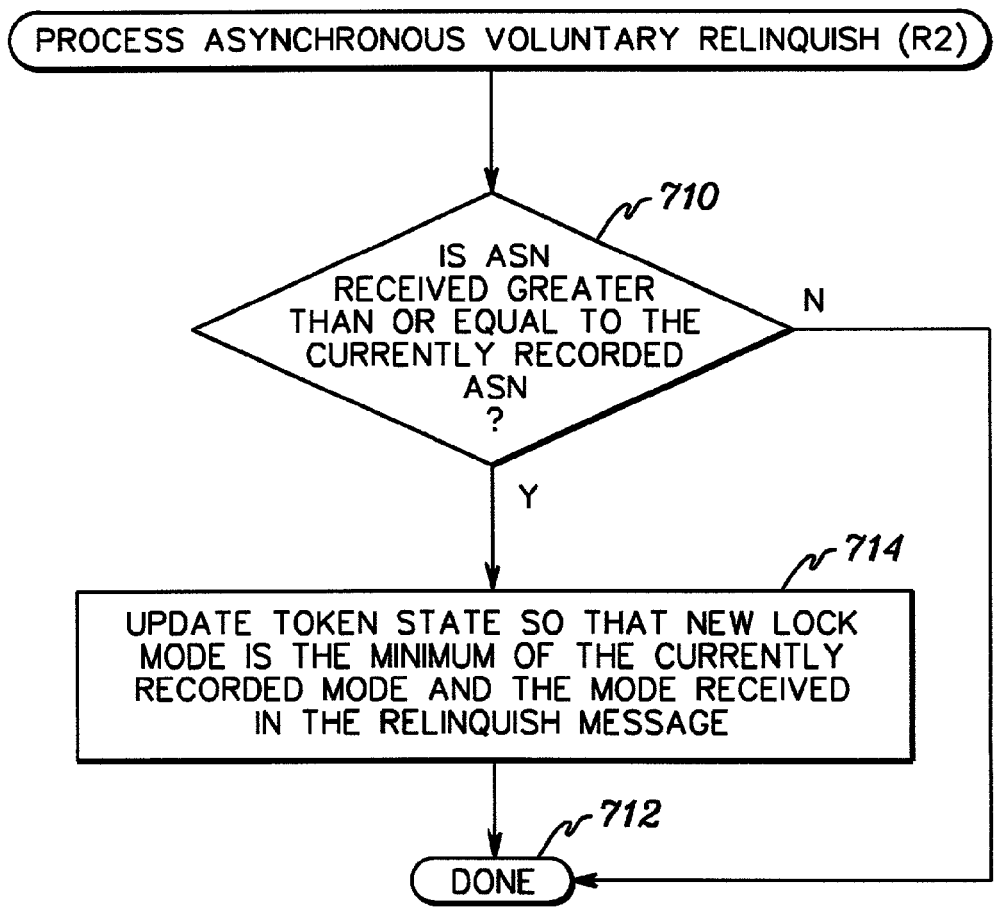
Figure 8A:
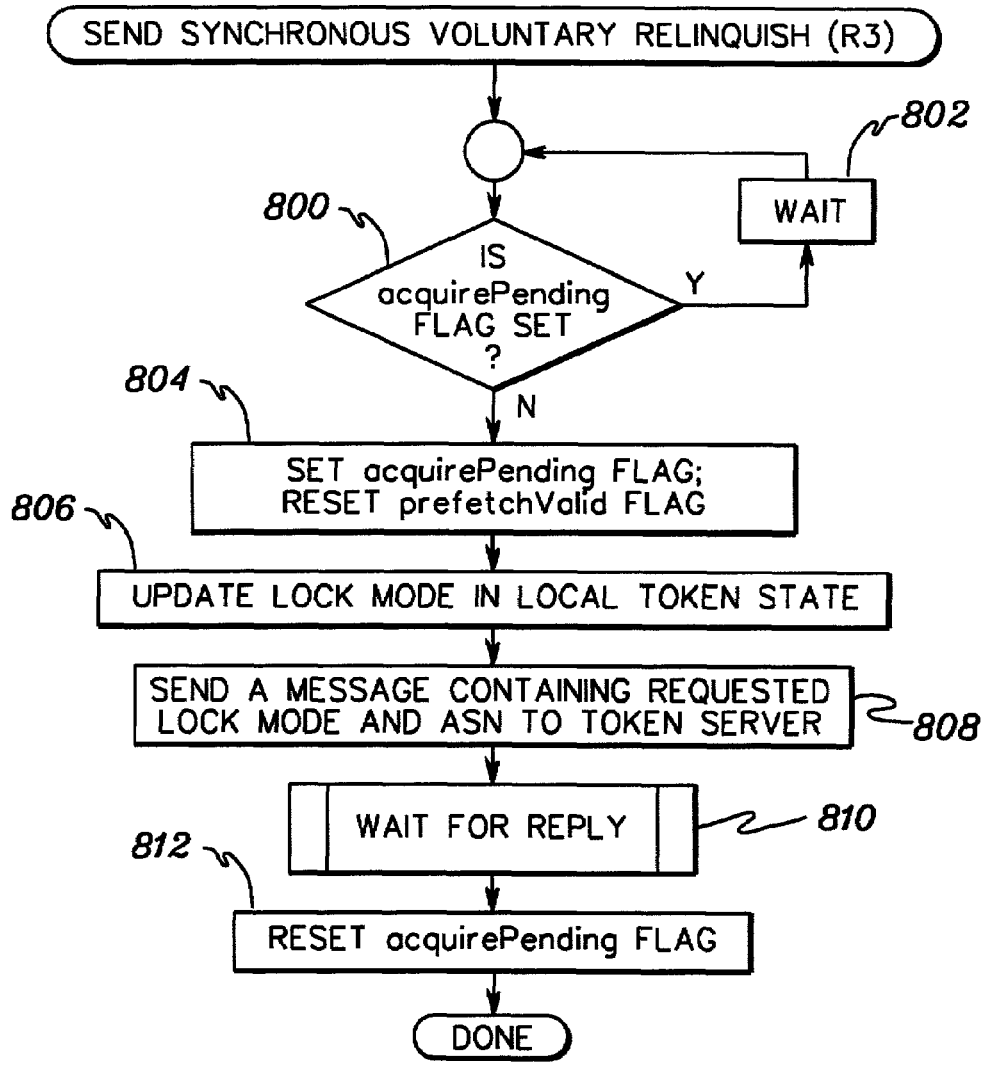
FIGS. 8a-8b depict one embodiment of the logic associated with sending and processing a synchronous voluntary relinquish request, in accordance with an aspect of the present invention.
Figure 8B:
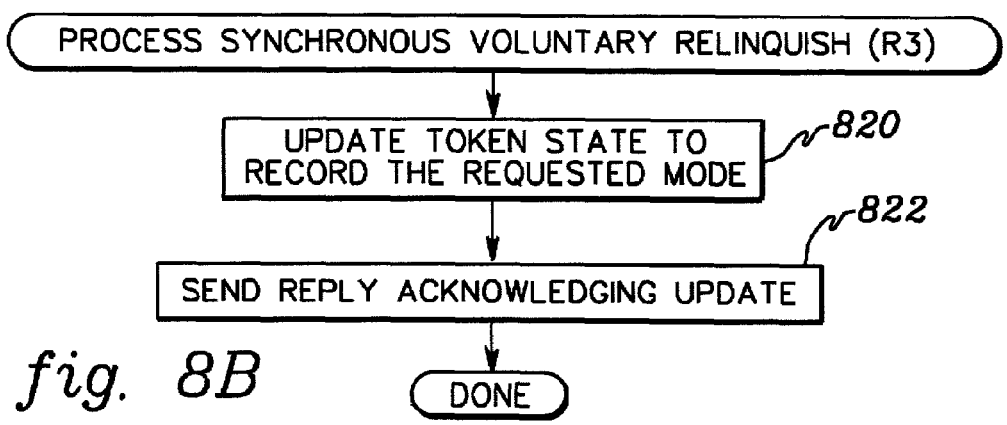

One embodiment of the logic associated with sending an asynchronous relinquish (R1) request for a desired token from a local lock manager to the token server in response to, for instance, a revoke request is described with reference to FIG. 6a. Initially, a determination is made as to whether the acquirePending flag is set and the received ASN is equal to the recorded ASN, INQUIRY 600. If the acquirePending flag is set and the received ASN is equal to the recorded ASN, then a synchronous request for this token is pending and the token server has already granted the token. Thus, the local lock manager waits to send the asynchronous relinquish request until after the reply to the synchronous request has been received and processed (acquirePending flag reset), STEP 602.

However, if the acquirePending flag is not set and/or the received ASN is not equal to the recorded ASN, then the prefetchValid flag is reset, STEP 604. Additionally, the lock mode in the local token state is updated, STEP 606, and a message including, for instance, a key of the object associated with the token, the requested lock mode and the ASN, is sent to the revoking node, STEP 608. In one example, this message is sent as a reply to the revoke request sent at STEP 412 of FIG. 4a. The reply may be batched with voluntary relinquish requests (R2), which are then sent as a single message that the revoking node forwards to the token server, as described above.

When the token server receives the asynchronous relinquish request, it processes that request. In one example, the token server receives the request indirectly by the node that revoked the tokens. For example, it receives the request as a part of the collected replies sent to the token server at STEP 416 (FIG. 4a). One embodiment of the logic associated with processing the request by the token server is described with reference to FIG. 6b. In one example, the token server updates the token state at the token server, such that the new lock mode is the minimum of the currently recorded mode and the mode received in the relinquish request, STEP 610. This concludes the processing of the asynchronous relinquish request.

In addition to sending an asynchronous relinquish request in response to a revoke request, an asynchronous voluntary request may be sent. One embodiment of the logic associated with sending such a request is described with reference to FIG. 7a. Initially, the lock mode in the local token state is updated, STEP 700, and a message including, for instance, a key of the object associated with the token, the requested lock mode and the ASN, is sent to the token server, STEP 702.

When the token server receives the asynchronous voluntary relinquish request, the token server processes the request. One embodiment of the logic associated with processing this request is described with reference to FIG. 7b. Initially, a determination is made as to whether the received ASN is greater than or equal to the currently recorded ASN, INQUIRY 710. If the received ASN is not greater than or equal to the currently recorded ASN, then processing of the asynchronous voluntary relinquish request is complete, STEP 712.

However, if the received ASN is greater than or equal to the currently recorded ASN, then the token state is updated, so that the new lock mode is the minimum of the currently recorded mode and the mode received in the relinquish message, STEP 714. This concludes the processing of the asynchronous voluntary relinquish request.

Another type of relinquish request is the synchronous voluntary relinquish (R3) request. One embodiment of the logic associated with sending such a request by the lock manager to the token server is described with reference to FIG. 8a. Initially, a determination is made as to whether the acquirePending flag for the requested token is set, INQUIRY 800. If the acquirePending flag is set, then the local lock manager waits, STEP 802. However, if the acquirePending flag is not set, then that flag is set and the prefetchValid flag is reset, STEP 804. Thereafter, the lock mode in the local token state is updated, STEP 806.

Additionally, a message including, for instance, a key, the requested lock mode, and the ASN, is sent to the token server, STEP 808. The local lock manager then waits for a reply from the token server, STEP 810. After receiving the reply, the local lock manager resets the acquirePending flag, STEP 812, and this concludes the processing associated with sending the synchronous voluntary relinquish request.

When the token server receives the synchronous voluntary relinquish request, it processes that request. One embodiment of the logic associated with processing the request is described with reference to FIG. 8b. In one example, the processing includes updating the token state to record the requested mode, STEP 820. Further, a reply is sent from the token server to the lock manager acknowledging the update, STEP 822. This is the reply indicated in FIG. 8a at STEP 810.

Described in detail above is one embodiment of a locking protocol that enables the use of asynchronous prefetching and/or relinquishing of tokens. In one aspect of the invention, the protocol allows multiple tokens to be acquired and/or relinquished in a single message.

As one example, a message may contain multiple prefetch requests for the same token, each specifying a different lock mode. This allows the token server to grant or prefetch a token in the strongest possible mode that does not conflict with tokens currently held by other nodes.

As a further example, multiple tokens may be relinquished in a single request. A node may relinquish tokens voluntarily (e.g., to reclaim memory space when the object covered by the token has not be accessed in a long time), or in response to a revoke request. In the later case in particular, it is desirable to relinquish additional tokens that are unlikely to be needed soon. For example, when a file size token is being revoked, and the file in question is not currently being accessed, it may be desirable to also relinquish or downgrade byte range tokens protecting the file data, as well as other tokens related to the same file. This is for two reasons: first, the original token request that caused the revoke of the file size token may include prefetch requests for additional tokens. Without relinquishing additional tokens in response to the revoke request, it may not be possible to honor the prefetch requests. Secondly, the byte range token may have been acquired through a prefetch request, but was never actually used. Giving up the byte range token voluntarily, saves messages to revoke the token later when it is needed by another node. This allows for more aggressive token prefetching, because it reduces the cost of revoking tokens that were prefetched unnecessarily.

Advantageously, one or more aspects of the present invention enable message delays and message traffic to be reduced.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of managing tokens usable in the locking of shared resources of a communications environment, said system comprising:

means for providing by a lock manager of said communications environment a request for a token usable in locking a shared resource of the communications environment, wherein the request is an asynchronous request for the token; and means for sending by said lock manager, prior to receipt of acknowledgment that the request for the token was processed, another request for the token;

wherein a single message includes a plurality of requests for the token;
wherein the plurality of requests includes at least two requests to acquire the token; and
wherein each request of the at least two requests specifies a lock mode, said lock mode being different for each request of the at least two requests.

2. The system of claim 1, wherein a single message includes a request for a plurality of tokens.

3. The system of claim 1, wherein said means for providing a request comprises means for sending from the lock manager to a token server a request to prefetch the token.

4. The system of claim 3, wherein said another request is an acquire request, said acquire request being sent prior to receiving a reply to the prefetch request.

5. The system of claim 1, wherein said means for providing a request comprises means for sending from the lock manager to a token server a request to relinquish the token.

6. The system of claim 5, wherein said another request is an acquire request, said acquire request being sent without having acknowledgment that the relinquish request was processed.

7. The system of claim 1, further comprising means for processing at least one request of said request and said another request.

8. The system of claim 7, wherein said means for processing comprises means for using one or more of a sequence number and at least one flag to process said at least one request, wherein the sequence number identifies an order in which requests from a particular client are issued in that the sequence number associated with a given token increases as the particular client issues new requests for the given token, and wherein a flag of the at least one flag tracks pending token requests and is used to detect if a conflicting request was issued before a previous request completed.

9. A system of managing tokens usable in the locking of shared resources of a communications environment, said system comprising:
means for sending a prefetch request from a lock manager to a token server to prefetch a token usable in locking a shared resource of the communications environment, wherein the prefetch request is an asynchronous request for the token;
means for sending from said lock manager to said token server, prior to said token server replying to said prefetch request, an acquire request to acquire said token; and
means for processing at least one request of said prefetch request and said acquire request, said means for processing using at least one of a sequence number and one or more flags to process said at least one request;
wherein said means for processing uses said at least one of the sequence number and the one or more flags to process said at least one request in an appropriate order, wherein the sequence number identifies an order in which requests from a particular client are issued in that the sequence number associated with a given token increases as the particular client issues new requests for the given token, and wherein a flag of the at least one flag tracks pending token requests and is used to detect if a conflicting request was issued before a previous request completed.

10. The system of claim 9, wherein said means for sending the prefetch request comprises means for sending a prefetch request for a plurality of tokens, and wherein said means for sending the acquire request comprises means for sending from said lock manager to the token server an acquire request for at least one token of said plurality of tokens, prior to said token server replying to the prefetch request.

11. The system of claim 9, wherein said means for processing comprises:
means for processing the prefetch request by said token server; and
means for sending a reply to the prefetch request from the token server to the lock manager, the reply being received by the lock manager subsequent to the lock manager sending the acquire request for the token.

12. The system of claim 11, wherein said means for processing further comprises:
means for receiving by the lock manager the reply to the prefetch request; and
means for determining by the lock manager that the acquire request is to take precedence over the prefetch request.

13. The system of claim 12, wherein said means for determining comprises means for checking a value of a flag that indicates that the acquire request is being processed or has been processed.

14. The system of claim 9, wherein the prefetch request includes a plurality of prefetch requests for the token.

15. A system of managing tokens usable in the locking of shared resources of a communications environment, said system comprising:
means for sending a relinquish request from a lock manager to a token server to relinquish a token usable in locking a shared resource of the communications environment, wherein the relinquish request is an asynchronous request to relinquish the token;
means for sending from said lock manager to said token server an acquire request to acquire said token, prior to receipt of confirmation that the relinquish request was processed; and
means for processing at least one request of said relinquish request and said acquire request, said processing using at least one of a sequence number and one or more flags to process said at least one request;
wherein said means for processing uses said at least one of a sequence number and one or more flags to process said at least one request in an appropriate order, wherein the sequence number identifies an order in which requests from a particular client are issued in that the sequence number associated with a given token increases as the particular client issues new requests for the given token, and wherein a flag of the at least one flag tracks pending token requests and is used to detect if a conflicting request was issued before a previous request completed.

16. The system of claim 15, wherein said means for sending the relinquish request comprises means for sending a request to relinquish a plurality of tokens, and wherein said means for sending the acquire request comprises means for sending from said lock manager to the token server an acquire request for at least one token of said plurality of tokens, without having confirmation that the relinquish request was processed.

17. The system of claim 15, wherein the relinquish request is in response to a revoke request.

18. The system of claim 15, wherein the relinquish request is a voluntary request.

19. A system of managing tokens usable in the locking of shared resources of a communications environment, said system comprising:

a lock manager of said communications environment adapted to provide a request for a token usable in locking a shared resource of the communications environment, wherein the request is an asynchronous request for the token; and said lock manager being further adapted to send another request for the token, prior to receipt of acknowledgment that the request for the token was processed;

wherein a single message includes a plurality of requests for the token;

wherein the plurality of requests includes at least two requests to acquire the token; and wherein each request of the at least two requests specifies a lock mode, said lock mode being different for each request of the at least two requests.

20. A system of managing tokens usable in the locking of shared resources of a communications environment, said system comprising:

a lock manager to send a prefetch request to a token server to prefetch a token usable in locking a shared resource of the communications environment, wherein the prefetch request is an asynchronous request for the token;

said lock manager being adapted to send to said token server an acquire request to acquire said token, prior to said token server replying to said prefetch request; and at least one of the lock manager and the token server adapted to process at least one request of said prefetch request and said acquire request, the processing using at least one of a sequence number and one or more flags to process said at least one request;

wherein said processing uses said at least one of the sequence number and the one or more flags to process said at least one request in an appropriate order, wherein the sequence number identifies an order in which requests from a particular client are issued in that the sequence number associated with a given token increases as the particular client issues new requests for the given token, and wherein a flag of the at least one flag tracks pending token requests and is used to detect if a conflicting request was issued before a previous request completed.

21. A system of managing tokens usable in the locking of shared resources of a communications environment, said system comprising:

a lock manager to send a relinquish request to a token server to relinquish a token usable in locking a shared resource of the communications environment, wherein the relinquish request is an asynchronous request to relinquish the token;

said lock manager being adapted to send to said token server an acquire request to acquire said token, prior to receipt of confirmation that the relinquish request was processed; and at least one of the lock manager and the token server adapted to process at least one request of said relinquish request and said acquire request, the processing using at least one of a sequence number and one or more flags to process said at least one request;

wherein said processing uses said at least one of a sequence number and one or more flags to process said at least one request in an appropriate order, wherein the sequence number identifies an order in which requests from a particular client are issued in that the sequence number associated with a given token increases as the particular client issues new requests for the given token, and wherein a flag of the at least one flag tracks pending token requests and is used to detect if a conflicting request was issued before a previous request completed.

* * * * *